Aug. 10, 1926.
P. MUELLER ET AL
1,595,310
COMPRESSION COUPLING
Original Filed Jan. 9, 1920    2 Sheets-Sheet 1
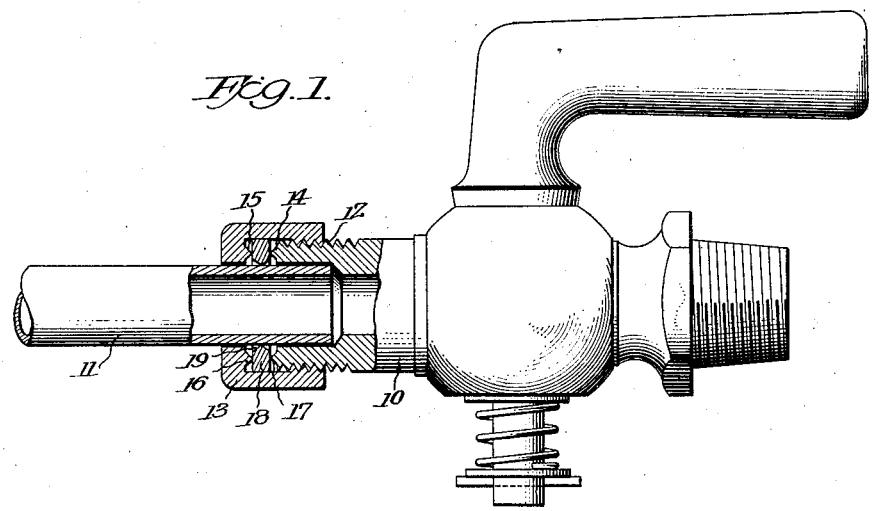
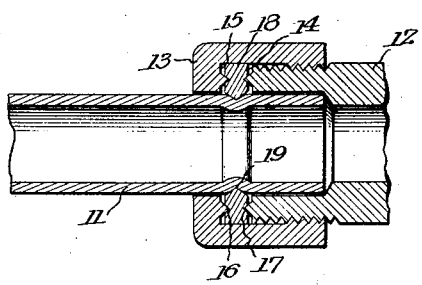
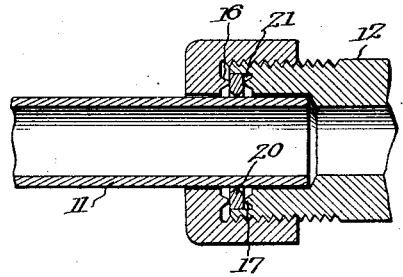
Inventors
Philip Mueller
Anton C. Schuerman
By Cushman, Bryant & Darby
Attorneys

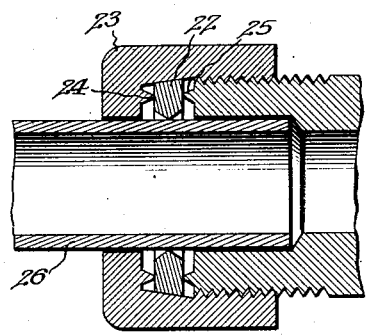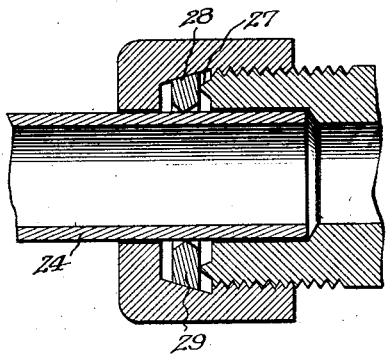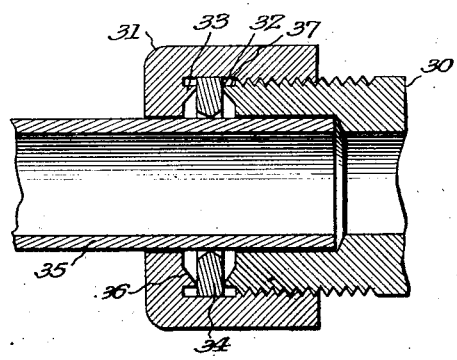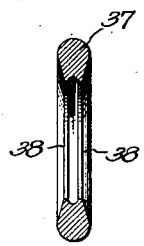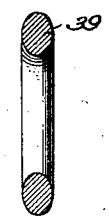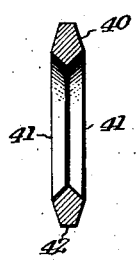

Patented Aug. 10, 1926.

1,595,310

UNITED STATES PATENT OFFICE.

PHILIP MUELLER AND ANTON C. SCHUERMANN, OF DECATUR, ILLINOIS, ASSIGNORS TO ADOLPH MUELLER, TRUSTEE, OF DECATUR, ILLINOIS.

COMPRESSION COUPLING.

Original application filed January 9, 1920, Serial No. 350,455. Divided and this application filed September 26, 1923. Serial No. 664,938.

The present invention, which is a division (under official requirement) of applicants' co-pending application, Serial No. 350,455, filed January 9th, 1920, and patented Nov. 18, 1924, Number 1,516,396, relates to improvements in pipe couplings generally, but deals more especially with pipe connections wherein the packing and washers customarily employed in such installations are eliminated, and an efficient and economical fluid tight joint is provided by means of a preformed compression member that is suitably interposed in the coupling, so that when the latter is set up the compression member is forced to expand in radial lines only against the inner pipe of the coupling so as to insure an indenting engagement therewith.

While we have, for illustrative purposes, disclosed and described the invention as applied to a faucet coupling, it will be understood that the same is equally adapted for use with other types and forms of couplings.

Referring to the drawings wherein is disclosed a preferred embodiment of our invention:

Figure 1 is a view partly in section showing the coupling assembled, but not set up or tightened.

Figure 2 is an enlarged sectional view of the coupling set up.

Figure 3 is a modified form of the invention.

Figures 4, 5 and 6 are still further modifications.

Figures 7, 8 and 9 are sectional views of compression members of different forms.

Referring to the drawings, in which like numerals indicate like parts in the several views, 10 denotes a cock or faucet of any suitable construction and design, which has been arbitrarily selected as the outer or telescoped section of the coupling. The inner or telescoping member is conventionally indicated by the pipe 11, and is arranged to be adjustably secured to the threaded shank 12 of the cock 10 by means of the nut 13, which is interiorly recessed adjacent its inner end for engagement with the corresponding threaded portion on the shank 12.

The opposed walls 14 and 15 of the shank 12 and nut 13 are preferably arranged perpendicular to the longitudinal axis of the pipe, and are each provided with wedging annuli or projections 16 and 17, respectively.

Between the annuli 16 and 17 and surrounding the inner pipe member there is provided a continuous ring or compression member 18, which is preferably preformed and will be of such shape in cross section that it may effectively be forced, in radial lines only, into tight engagement with the outer periphery of the pipe 11 when the coupling is set up.

It will be obvious from the disclosure in Figure 2 that upon the tightening of the nut 13 on the shank 12 of the faucet, the projecting annuli 16 and 17 are forced into biting engagement with the compression member 18, so as to force the inner periphery of the member 18 into indenting engagement with the outer surface of the pipe 11, as shown.

The compression member or ring 18 is preferably made of a malleable metal, which is of sufficient hardness so that when the coupling is set up it will indent the member or pipe 11, and will, under pressure, flow and expand without fracture.

While the compression member 18 is preferably shown as substantially pentagonal in cross section; having its base in contact with the inner wall of the nut 12, and its converging sides terminating so as to provide a penetrating edge 19, which is arranged when the coupling is set up to be forced radially into engagement with the outer periphery of the pipe 11, it is to be understood that the ring 18 may assume various other forms, such as shown in Figures 7, 8 and 9.

In Figure 3, wherein is disclosed a modified form of the invention, the coupling is very similar to that shown in Figure 1, with the exception that the compression member 20 is made smaller so as to be housed within a recess 21 formed in the shank 12 of the faucet. Such recess could, of course, be formed in the nut, if desired. The annuli 16 and 17 function in the same manner as heretofore described, to cause the lower portion of the compression member 20 to bite into and displace the metal of the compression member, while the upper portion or outer periphery of the compression member 17 takes a firm bearing against the wall of the recess 21 so as to constrict or limit the upward movement thereof.

In the form disclosed in Figures 4 and 5, the invention differs from that heretofore disclosed in that the outer periphery of the compression member 22 is inclined and engages a correspondingly inclined surface on the inner wall of the coupling nut 23. The spreading projections 24 and 25 formed on the opposed walls of the coupling nut and the shank are arranged to bite into the compression member 22 in the manner heretofore described so as to force the latter radially into indenting engagement with the outer surface of the pipe 26.

In this particular construction, it will be noted that there is a double action on the compression member 22 as the coupling is set up, since the inclined wall of the nut 23 tends to force the compression member 22 inwardly against the pipe 26 and the upsetting elements or projections 24 and 25 bite into and distort the compression member 22 so as to supplement and increase the radial movement of the compression member.

Figure 5 differs from Figure 4 in that the biting projection on the coupling is dispensed with and the projection 27 on the end of the shank, together with the inclined surface 28 tend to force the inner periphery of the compression member 29 into biting engagement with the pipe.

In the form of the invention disclosed in Figure 6 the member 30 and the coupling nut 31 are of the same general construction as heretofore described, the salient point of difference being in the formation and arrangement of the biting elements 32 and 33, which are inclined or wedge faced on one side only so as to give a substantially triangular formation in cross section. By this construction, displacement of the compression member 34 when the coupling is set up, takes place in a downward direction only so as to insure a maximum compression of the member 34 against the pipe 35. The biting members 32 and 33 are cut back or recessed at 36 so as to give proper biting edges and provide clearance space for the small amount of metal flow at the outer periphery of the compression member when the coupling is set up.

In Figure 7 a preformed compression member 37 is shown in which a plurality of compressing elements 38 are formed on the inner periphery thereof so as to give a double upset or compression of the pipe or member about which the compression member is constricted.

In Figure 8 the compression member or ring 39 is of generally elliptical form in cross section with its major axis perpendicular to the center axis of the ring so as to render it readily adapted to compress and grip the pipe when subjected to pressure.

In Figure 9 is shown a compression member 40 of multi-lateral or polygonal form in cross section in which the inner faces slope or converge so as to form edges 41, while the outer faces slope to a flat base 42.

It is to be understood that mechanical modifications of the construction herein shown and described may be made without departing from the spirit of the present invention and the scope of the appended claims.

We claim:

1. In a coupling, the combination of two telescoping pipes, a nut threaded to the outer or telescoped pipe and having an expansion chamber in its rear end, a continuous preformed compression ring between the inner wall of the nut and the end wall of the outer or telescoped pipe and surrounding the inner or telescoping pipe, and means on the opposed walls of said nut and outer pipe to engage and distort said compression ring so as to expand a portion of said ring in said expansion chamber and constrict it in radial lines only upon and indent said inner pipe.

2. In a coupling, the combination of two telescoping pipes, a nut threaded to the outer or telescoped pipe and having an expansion chamber in its rear end, a continuous preformed compression ring between the vertical inner wall of the nut and the end wall of the outer or telescoped pipe and surrounding the inner or telescoping pipe, and projections on the opposed wall of said nut and outer pipe to engage and distort said compression ring so as to expand a portion of said ring in said chamber and constrict it in radial lines only upon and indent said inner pipe.

3. In a coupling, the combination of two telescoping pipes, a nut threaded to the outer or telescoped pipe and having an expansion chamber in its rear end, a continuous preformed compression ring between the vertical wall of the nut and the end wall of the outer or telescoped pipe and surrounding the inner or telescoping pipe, and circumferentially arranged projections on the opposed walls of said nut and outer pipe to engage and distort said compression ring so as to expand a portion of said ring in said chamber and constrict it in radial lines only upon and indent said inner pipe.

4. In a coupling, the combination of two telescoping pipes, a nut threaded to the outer or telescoped pipe and having an expansion chamber in its rear end, a continuous preformed compression ring between the inner wall of the nut and the end wall of the outer or telescoped pipe and surrounding the inner or telescoping pipe, and annular means concentric to the aperture in said nut on the opposed walls of said nut and outer pipe to engage and distort said compression ring so as to expand a portion of said ring in said chamber and constrict it in radial lines only upon and indent said inner pipe.

5. In a coupling, the combination of two telescoping pipes, a nut threaded to the outer or telescoped pipe and having an expansion chamber in its rear end, a continuous preformed pentagonal compression ring between the vertical inner wall of the nut and the end wall of the outer or telescoped pipe and surrounding the inner or telescoping pipe, and projections on the opposed wall of said nut and outer pipe to engage and distort said compression ring so as to expand a portion of said ring and constrict it in radial lines only upon and indent said inner pipe.

6. In a coupling, the combination of two telescoping pipes, a nut threaded to the outer or telescoped pipe and having an expansion chamber in its rear end, a continuous preformed compression member between the vertical inner wall of the nut and the end wall of the outer or telescoped pipe and surrounding the inner or telescoping pipe, said member having its base formed on its outer periphery and its converging sides terminating at a point centrally of its inner periphery, and projections on the opposed wall of said nut and outer pipe to engage and distort said compression member so as to expand a portion of said member and constrict it in radial lines only upon and indent said inner pipe.

7. In a coupling, the combination of two telescoping pipes, a nut threaded to the outer or telescoped pipe, said nut having an expansion chamber provided with an inclined wall, a continuous preformed pentagonally formed compression member having a correspondingly inclined surface positioned between the vertical inner wall of the nut and the end wall of the outer or telescoped pipe and surrounding the inner or telescoping pipe, and means projecting from the opposed walls of said nut and outer pipe to engage and distort said compression member so as to expand a portion of said member in said expansion chamber and constrict it in radial lines upon and indent said inner pipe.

8. In a coupling, the combination of two telescoping pipes, a nut threaded to the outer or telescoped pipe, said nut having an expansion chamber provided with an inclined wall, a continuous preformed compression ring having a correspondingly inclined surface positioned between the inner wall of the nut and the end wall of the outer or telescoped pipe and surrounding the inner or telescoping pipe, and means projecting from the opposed walls of said nut and outer pipe to engage and distort said compression ring so as to expand a portion of said ring in said expansion chamber and constrict it in radial lines only and indent said inner pipe.

9. In a coupling, the combination of two telescoping pipes, a nut threaded to the outer or telescoped pipe, and having an expansion chamber in its rear end, a continuous preformed compression ring between the inner wall of the nut and the end wall of the outer or telescoped pipe and surrounding the inner or telescoping pipe, and means projecting from the wall of the outer pipe for engaging and distorting said compression ring so as to expand said ring in said expansion chamber and constrict it in radial lines only upon and indent said inner pipe.

10. In a coupling, the combination of two telescoping pipes, a nut threaded to the outer or telescoped pipe and having an expansion chamber in its rear wall, a continuous preformed compression ring between the inner wall of the nut and the end wall of the outer or telescoped pipe and surrounding the inner or telescoped pipe, and inwardly projecting means in said expansion chamber adapted to engage and distort said compression ring so as to expand a portion of said ring and constrict it in radial lines only upon and indent said inner pipe.

In testimony whereof we have hereunto set our hands.

PHILIP MUELLER.
ANTON C. SCHUERMANN.